United States Patent [19]
Cheng et al.

[11] 3,984,528
[45] Oct. 5, 1976

[54] CARBON BLACK REACTOR AND PROCESS
[75] Inventors: Paul J. Cheng; John W. Vanderveen; Harold R. Hunt, all of Bartlesville, Okla.
[73] Assignee: Phillips Petroleum Company, Bartlesville, Okla.
[22] Filed: Dec. 1, 1975
[21] Appl. No.: 636,484

[52] U.S. Cl............................ 423/450; 423/456; 23/259.5; 431/173; 431/8; 431/9; 110/28 F
[51] Int. Cl.²....................................... C01B 31/02
[58] Field of Search............ 23/259.5, 277 R; 431/8, 431/9, 173, 350, 353; 423/450, 456; 260/679 R; 110/28 F

[56] References Cited
UNITED STATES PATENTS

| 2,617,714 | 11/1952 | Arnold | 23/259.5 UX |
| 2,659,662 | 11/1953 | Heller | 23/259.5 UX |
| 2,659,663 | 11/1953 | Heller | 23/259.5 UX |
| 2,735,753 | 2/1956 | Braendle | 23/259.5 UX |
| 2,768,067 | 10/1956 | Heller | 23/259.5 UX |
| 2,852,346 | 9/1958 | Austin | 23/259.5 UX |
| 3,046,095 | 7/1962 | Williams | 23/259.5 UX |
| 3,490,869 | 1/1970 | Heller | 23/259.5 X |
| 3,799,745 | 3/1974 | Cheng | 23/259.5 |

Primary Examiner—James M. Tayman, Jr.

[57] ABSTRACT

Various carbon black reactors having triangular cross-sections generate a highly turbulent flow of the reactants therein to produce high-tint carbon black.

29 Claims, 12 Drawing Figures

CARBON BLACK REACTOR AND PROCESS

The present invention relates to the production of carbon black. In one of its more specific aspects, this invention relates to a carbon black reactor.

BACKGROUND OF THE INVENTION

It is known in the art that carbon black, an important ingredient in many rubber products, can be produced by pyrolytic decomposition of hydrocarbons. One of the most successful embodiments of this process is carried out by axially feeding a hydrocarbon feedstream into a tubular reactor along the axis and generating a spiraling flow of hot combustion gases around this feedstream. Whereas this process produces carbon black with desirable properties, a further increase in surface area as measured by tint for a given combination of air and hydrocarbon rates would prove beneficial economically and therefore would be desirable.

THE INVENTION

It is one object of this invention to provide a process for producing carbon black.

Another object of this invention is to provide a process for producing a small particle-size carbon black, or a carbon black with high tint.

A further object of this invention is to provide a carbon black reactor in which the reactants are subjected to very high degree of turbulence.

A still further object of this invention is to provide a carbon black reactor which can be relatively inexpensively built.

Still another object of this invention is to provide a carbon black reactor having a construction that allows this reactor to be built by modifying standard carbon black-producing reactors.

Figure 1:
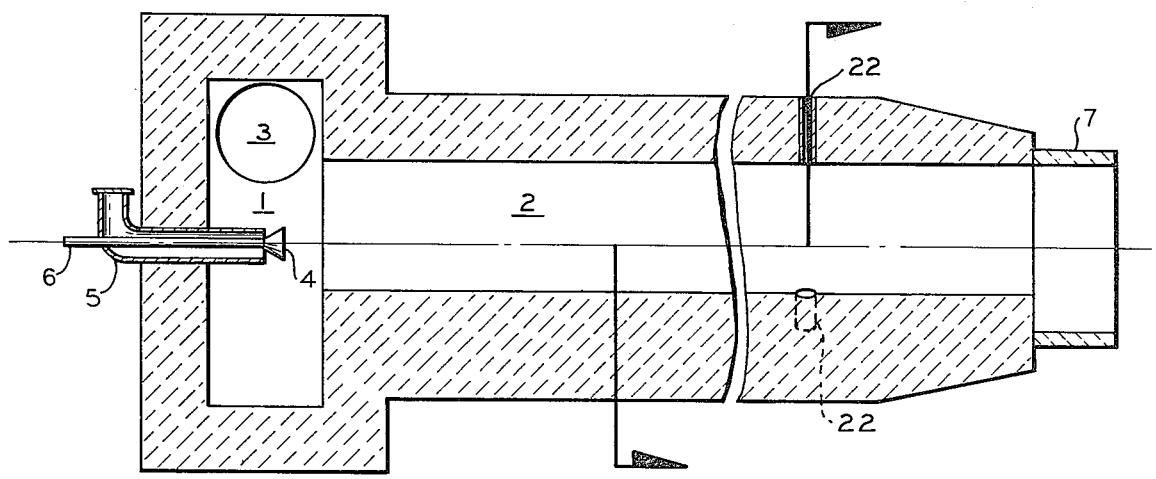
Figures 2A, 2B, 2C:
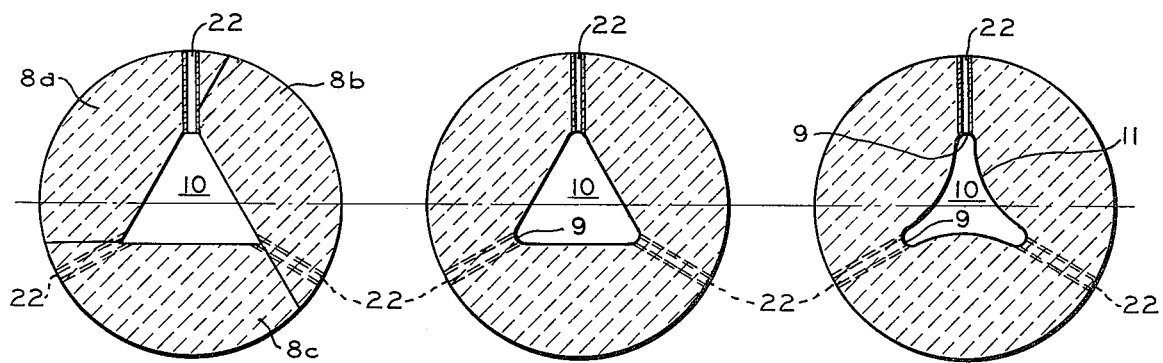
Figure 3:
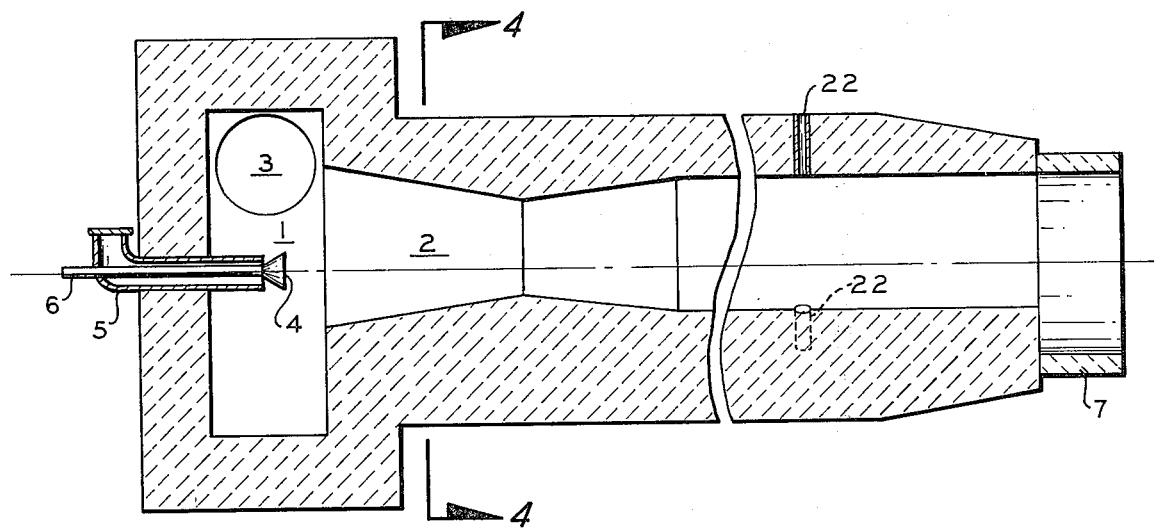
Figure 4:
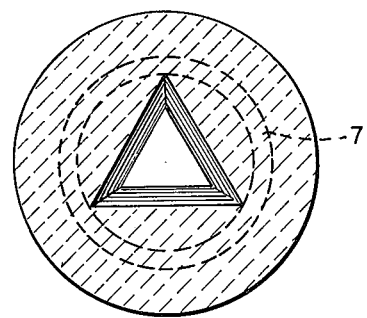
Figure 5:
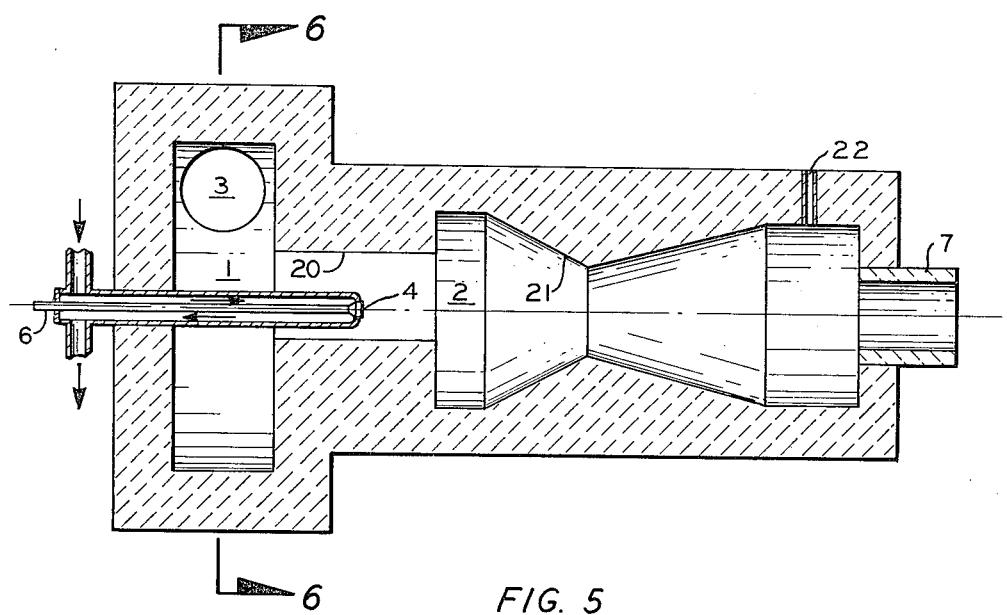
Figure 6:
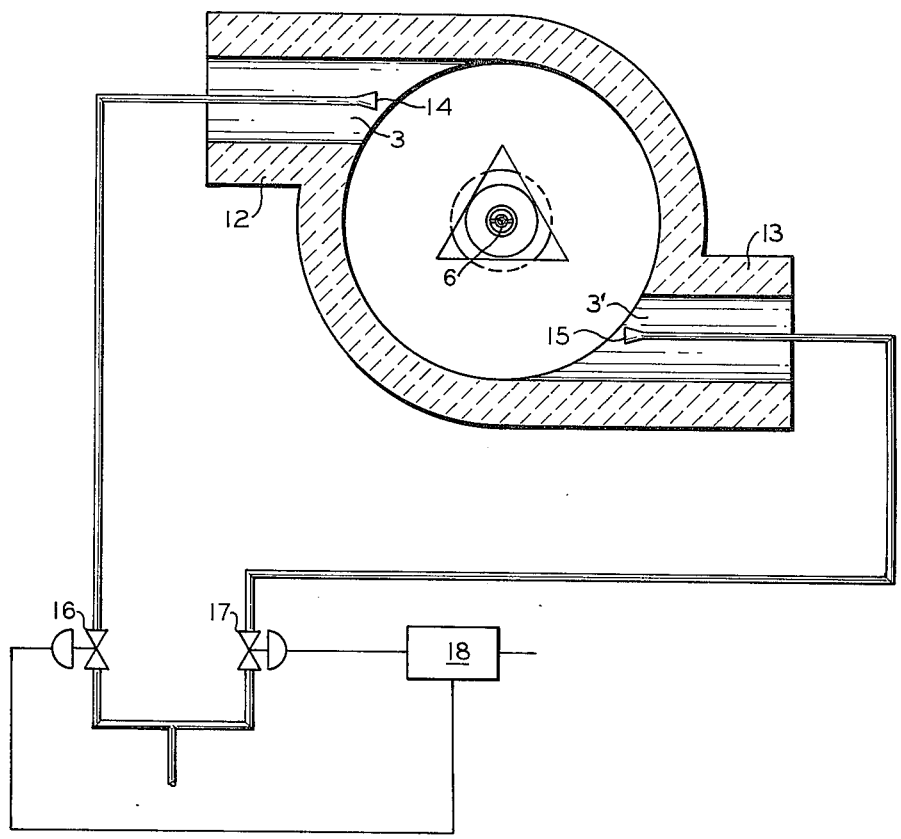
Figure 7:
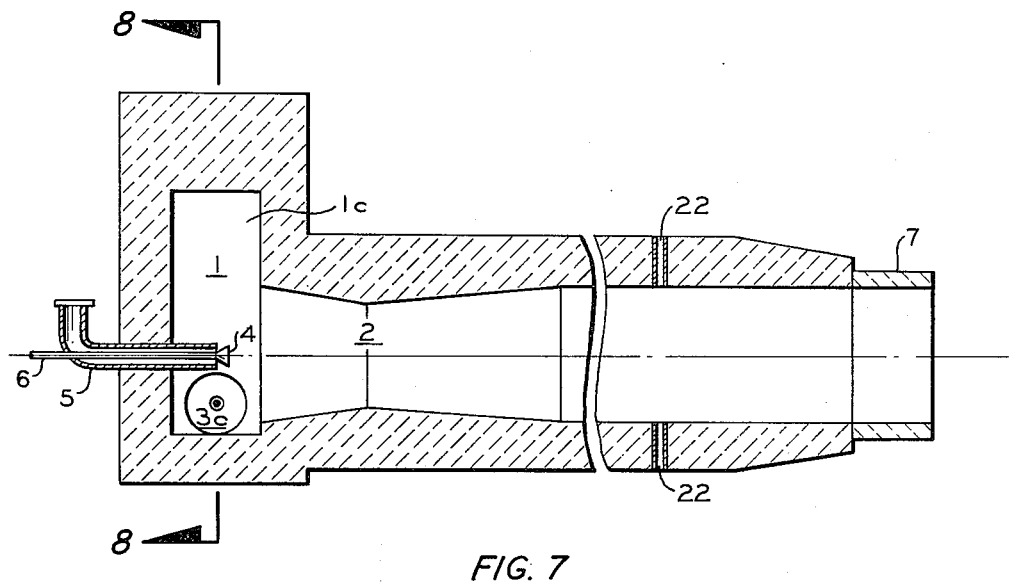
Figure 8:
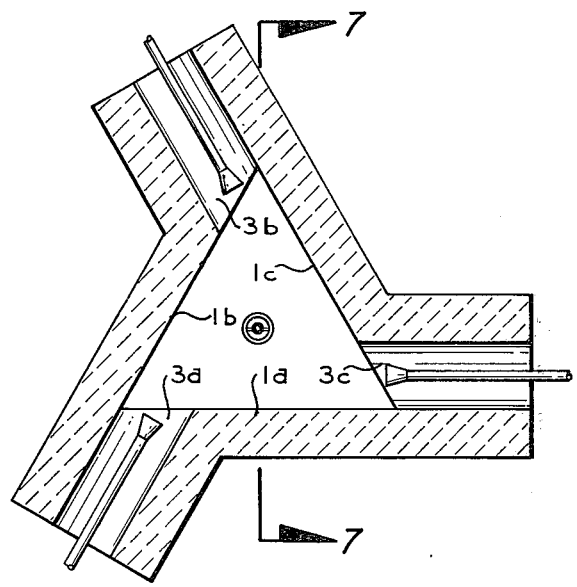
Figure 9:
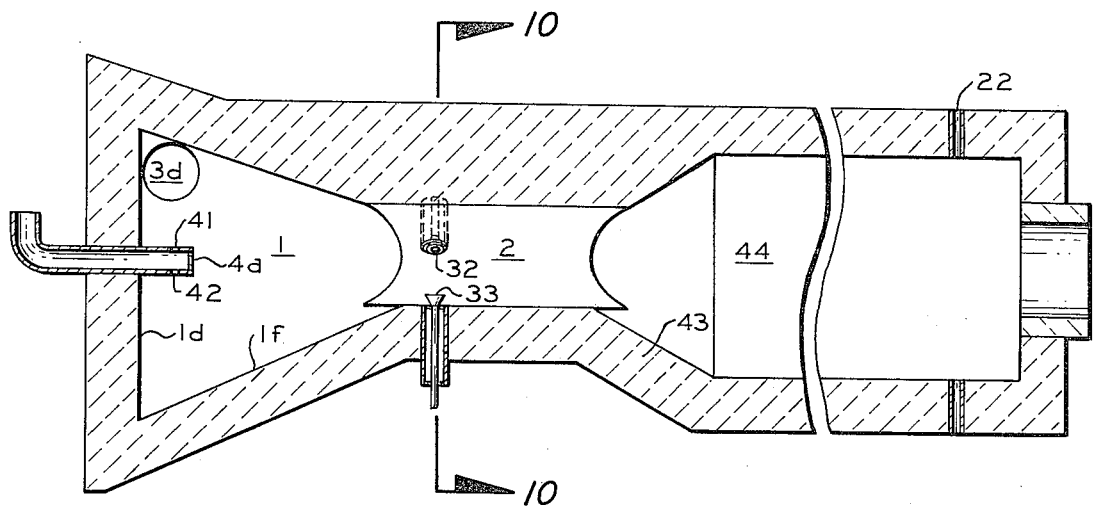
Figure 10:
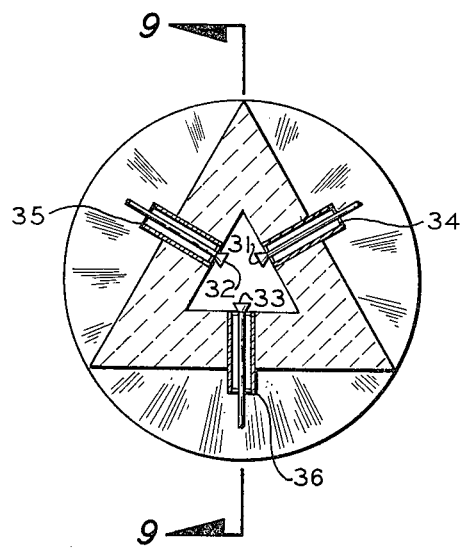

These and other objects, advantages, features, details and embodiments of this invention will become apparent to those skilled in the art from the following detailed description of the invention, the examples, the appended claims, and the drawing in which FIG. 1 shows a longitudinal cross-section through a carbon black reactor, FIGS. 2a, 2b and 2c show various embodiments of cross-sections of the reaction section of the reactor shown in FIG. 1, FIG. 3 shows a longitudinal cross-section of a carbon black reactor, FIG. 4 shows a cross-section along line 4—4 through the reactor shown in FIG. 3, FIG. 5 shows a longitudinal cross-section through another embodiment of a carbon black reactor, FIG. 6 shows a cross-section along line 6—6 through the reactor shown in FIG. 5, FIG. 7 shows a longitudinal cross-section through another carbon black reactor, FIG. 8 shows a cross-section along the lines 8—8 of the carbon black reactor shown in FIG. 8, FIG. 9 shows another longitudinal cross-section through a carbon black reactor, FIG. 10 shows a cross-section along line 10—10 through the carbon black reactor shown in FIG. 9.

Generally speaking, our invention is based on the discovery that high-tint carbon black can be produced in standard carbon black reactors employing the modification that either the precombustion section or the reaction section, or both, have essentially triangular cross-section or that the reaction section has triangular or rectangular cross-section, and the hydrocarbon feed is radially introduced into this reaction section from approximately the midpoints of the confining lines of, respectively, the triangle or rectangle of the cross-section mentioned. Without limiting the invention by any means, and although the mechanisms involved are not yet fully understood, it is presently believed that the high tint of the carbon black or the small particle size of the carbon black produced in the reactors of this invention and by the process of this invention is caused by a high turbulence generated by the cross-sections defined.

In accordance with one embodiment of this invention, there is provided a tubular carbon black reactor having a longitudinal axis extending from the upstream end to the downstream end thereof, which reactor comprises a cylindrical combustion section being confined by an upstream wall, a cylindrical wall, and a downstream wall, further comprising in axial alignment and fluid communication operatively connected with the cylindrical combustion section at the downstream wall thereof, a reaction section, at least a portion of said reaction section being defined by three side walls, said portion having an essentially triangular cross-section, first means for generating a spirally swirling flow of hot combustion gases in said combustion section, said first means being attached to said combustion section, further comprising second means for introducing hydrocarbon feedstock essentially along the longitudinal axis in axial direction into the reactor, said second means being attached to an upstream confining wall of the reactor, further comprising third means for the withdrawal of carbon black-containing gas connected to the downstream end of said reaction section. In this reactor the swirling hot combustion gases mix with the hydrocarbon feed and this mixture, entering the portion of the reaction section having triangular cross-section, is subjected to a very high turbulence while the carbon black is formed by pyrolytic decomposition of the hydrocarbon feed.

By cross-section in this specification, the internal shape of a portion of the carbon black reactor is meant that it is defined by a cross-section perpendicular to the longitudinal axis at the specific location. Thus the triangular cross-section of the reaction section refers to the fact that the passage through which the reactants can pass in the reaction section has the shape of a triangle, when one cuts through the reaction section perpendicularly to the longitudinal reactor axis.

The cross-section of the reaction section in this embodiment of the invention is essentially triangular. This means that small deviations from the geometry of a triangle are included in this invention. In accordance with one embodiment, for instance, the edges of the triangle can be rounded off. Additionally, the sides of the triangle may be rounded inward or beveled; thus a slightly convex or slightly concave shape of the triangle sides is within the scope of this invention.

The shape of the triangular cross-section of the reaction section should preferably be such that all three angles of the triangle are within the range of 30° to 100°. Presently preferred is a symmetrical cross-section in which the reaction section, at least in a portion thereof, has a cross-section of an equilateral triangle.

It is presently preferred for the embodiment defined above that the reaction section has a smaller diameter than the combustion section. Particularly, the diameter of a circle drawn through the three corners of the triangular cross-section of the reaction section should not be larger than ⅔ of the diameter of the cylindrical precombustion section.

Generally, and in accordance with a preferred embodiment of this invention, the means for generating the spiraling flow of the hot combustion gases comprise at least one tangentially facing opening in the cylindrical wall of the combustion section for tangential introduction of hot combustion gases. By the term "hot combustion gases", both the hot gases produced by the combustion of fuel with an oxidant selected from the group consisting of oxygen, air, and oxygen enriched air, and the combusting mixture of the fuel and the oxidant are meant. In other words, the hot combustion gases can be introduced into the combustion section as such from a location where the actual combustion took place outside of said combustion section or, as is usually done and preferred, the hot combustion gases can be generated right at the tangential entrance into the combustion section by locating, e.g., gas burners near this entrance.

In order to spray the hydrocarbon feed into the area of highest turbulence, it is presently preferred to arrange the discharge end of a hydrocarbon feed nozzle along the axis at or downstream of the center of the combustion section.

It is known in the art that the carbon black reaction can be slowed down or stopped by introducing a quench fluid into the downstream section of the reaction section. In accordance with this invention, this can advantageously be achieved by introducing the quench fluid through nozzles located in the corners of the triangular cross-section. This embodiment of the invention has the additional advantage that the quench nozzles are not subjected to the highest temperatures in the reaction section, but are located in the relatively "cool" corners of the reaction sections.

The objects of this invention are achieved in accordance with one embodiment by arranging a choke with a triangular cross-section in the upstream end of an essentially cylindrically shaped reaction section. In this embodiment, not the entire reaction section but only the upstream end thereof is the portion with the triangular cross-section. In this upstream end the highest temperatures exist and, in order to produce small particle-size carbon black, it is desirable to generate a high turbulence there. This embodiment further provides the possibility to convert a standard reactor having a cylindrical reaction section into a high turbulence reactor as disclosed above by inserting the choke with triangular cross-section into the upstream portion of the reaction section.

The embodiment just described is further modified in accordance with another feature of this invention by extending a hydrocarbon feed nozzle into the choke with the triangular diameter and by connecting a first tangential inlet to the combustion section with a source of oxygen rich gases and a second tangential inlet to the combustion section with a source of a fuel rich combustion gases. In the choke with the triangular cross-section, the two portions of the hot combustion gases are vigorously mixed due to the high turbulence. Thereby, the two mixtures form a stoichiometric hot combustion gas mixture with the highest temperature and into this mixture the hydrocarbon feed is discharged. Thus, both the temperature and the mixing rate are at an optimum for the production of small particle-size carbon black. Optionally in this embodiment, the choke with the triangular cross-section can be followed by a venturi-shaped choke.

An oxygen-rich hot combustion gas would be produced by mixing air and a fuel gas such as natural gas or propane in a volume ratio of, e.g., 15:1, for natural gas ($CH_4$). A fuel-rich hot combustion gas, on the other hand, would be produced by mixing air and the fuel gas in a volume ratio of, e.g., 7.5:1, the stoichiometric gas mixture being achieved by a volume ratio of about 10:1 air to fuel gas volume ratio. The volume ratios are to be understood as the ratio of the respective volumes under normal temperature and pressure conditions.

The reaction section having a triangular cross-section is not limited to straight sections being confined by sidewalls which are essentially parallel to the longitudinal axis of the reactor. Rather, and in accordance with another embodiment of this invention, the reaction section, having triangular cross-section, can be shaped like a venturi so that the reaction section comprises an upstream portion converging in a downstream direction connected with a downstream portion diverging in downstream direction, both the upstream and the downstream portions having a triangular cross-section. This combination of venturi and triangular cross-section for the reaction section further increases the turbulence and the desired effects of the reactor of this invention.

A further embodiment of this invention consists in a tubular carbon black reactor having a longitudinal axis extending from the upstream end to the downstream end of the reactor and comprising a combustion section defined by an upstream confining wall, and a downstream confining wall, both being parallel to each other and perpendicular to the longitudinal axis and by three side confining walls, all three being essentially parallel to the longitudinal axis, so that the cross-section of the combustion section is approximately triangular. The reactor of this embodiment further comprises in axial alignment and open communication with the combustion section and attached to the downstream wall thereof, a longitudinal reaction section having a smaller cross-section than the combustion section. First means are attached to the combustion section for generating a closed loop flow of hot combustion gases along each one of said side walls in a direction perpendicular to the longitudinal axis, second means are provided for introduction of hydrocarbon feed along the longitudinal axis in axial direction into the reactor, and third means are provided for withdrawing carbon black containing gas from the downstream end of the reaction section. This embodiment of the carbon black reactor of this invention provides for a triangular cross-section of the combustion section of the reactor.

The introduction of the hot combustion gases is preferably achieved in this embodiment by providing three openings into the combustion section, one near each of the three edges where two side confining walls come together. Each hole is arranged in one of these two confining walls facing along the other of these two confining walls that form the edge near which the opening is located. Each of the three openings is in communication with a source of oxidant and fuel for generating the flow of hot combustion gases along the three side confining walls.

In this embodiment, the triangular cross-section preferably is limited to such triangles in which every angle is in the range of 30° to 100°. Preferably, the cross-section of the precombustion section of this embodiment is an equilateral triangle.

The reaction section of the reactor of the embodiment just described can essentially have any shape. Thus, the reaction section can be a straight cylindrical section. Presently preferred and in accordance with another embodiment, however, the reaction section of this reactor also has triangular cross-section. This additional deviation from the circular cross-section further increases the turbulence and the desired results. Advantageously, the two triangles of the combustion section and the reaction section are both equilateral triangles with the further provision that the two triangles are azimuthally turned relative to each other by 60°. This embodiment provides additional turbulence at the area where the combustion secton is connected to the reaction section.

Generally speaking, all of the embodiments disclosed above for the first carbon black reactor having the reaction section with triangular cross-section, constitute further embodiments for the embodiment of the carbon black reactor of this invention in which the reaction section has a triangular cross-section, too.

This invention furthermore provides for a carbon black reactor having a tubular cross-section and a longitudinal axis extending from its upstream to its downstream end which comprises a combustion section having a circular cross-section and, in axial alignment and open communication operatively connected with the combustion section, a reaction section constituting the narrowest of the two sections and being confined by three or four sidewalls and having essentially triangular or rectangular cross-section. Attached to the combustion section are first means for generating a closed loop of a spirally swirling flow of hot combustion gases in the combustion section. Furthermore, the reactor of this embodiment of the invention is provided with second means attached to the reaction section at approximately the center between two edges of the reaction section for introducing hydrocarbon feed radially into the reaction section. These second means are located between adjacent edges. These edges are defined by the intersection of two adjacent sidewalls. The second means preferably are located near the upstream end of the reaction section. By providing the hydrocarbon feed means for radial injection of the hydrocarbon feed, approximately equal distance from the edges, a buildup of carbon black in the reaction section at these locations where the swirling moving reaction mixture touches the reactor walls most extensively is effectively prevented. In the case of a triangular cross-section of unsymmetric shape, feed nozzles for introduction of hydrocarbon feed in radial direction preferably are arranged at locations where an inside circle (maximum diameter inscribed circle) touches the three sides of the triangular cross-section at the specific axial location thereof.

The carbon black reactor of this invention, too, is provided with third means for withdrawal of carbon black-containing smoke from the downstream of the reaction section. Furthermore, quench means for introducing quenching fluid can be provided for at the downstream end of the reaction section. For this embodiment of the carbon black reactor having the radial hydrocarbon feed, the preferred embodiments disclosed above in connection with the axial hydrocarbon feed also apply, if applicable.

Preferably, the first means for generating the swirling flow of hot combustion gases comprise tangential oxidant feed means for introducing oxidant selected from the group consisting of air, oxygen and oxygen enriched air, in essentially tangential direction in contact with the walls confining the combustion section. Fuel is radially introduced from approximately the longitudinal axis of the reactor in outward direction.

The combustion section of this reactor with radial hydrocarbon feed into the reaction section with triangular or rectangular cross-section is confined by an essentially plain upstream confining wall perpendicular to the longitudinal axis and by a frustoconically shaped confining wall having the longitudinal reactor axis as its axis. The frustoconically shaped confining wall is converging in downstream direction from the upstream confining wall into the reaction section with triangular or rectangular cross-section.

The combustion section can,, however, in accordance with another embodiment of this reactor with radial hydrocarbon feed, also be a standard combustion section being confined by essentially plain upstream and downstream confining walls being parallel to each other and perpendicular to the longitudinal reactor axis, and by a cylindrical wall connecting the two plain walls.

In the embodiment of this reactor with radial hydrocarbon feed into the non-circular reaction section in which the cross-section is rectangular, it is presently preferred to shape the reaction section such that the cross-section thereof is a square. Furthermore, and in accordance with still another embodiment, the reactor with the radial hydrocarbon feed has the downstream end of the reaction section connected to a widened quench and carbon black withdrawal section. This widened section slows down the axial velocity of the carbon black-containing gas flow, making possible a very efficient and controllable quench of the hydrocarbon-forming pyrolytic reaction.

The carbon black reactors described are built from materials that are standard in the art. Particularly, the walls of the combustion section and the reaction section are made from highly refractory material such as ceramic material. The hydrocarbon feed nozzle is usually made from heat-resistant metal such as stainless steel, and the entire carbon black reactor generally is surrounded by a steel housing.

In accordance with another embodiment of this invention, there is provided a process for the production of carbon black. In this process a spiraling flow of hot combustion gases in a combustion section of a carbon black reactor having a longitudinal axis extending from an upstream to a downstream end thereof, is generated. Hydrocarbon is fed in this process in axial direction along the longitudinal axis into the reactor and into admixture with the hot combustion gases. The mixture of hot combustion gases and hydrocarbon feed is moved along through a reaction section, which is in axial alignment and open communication operatively connected to the combustion section. The reaction section has a triangular cross-section so that the mixture of hot combustion gases and hydrocarbon feed are subjected to a turbulent movement while they are being passed through this reaction section. Carbon black-containing smoke, in accordance with the process of this invention, is withdrawn from the downstream end of the reaction section.

In accordance with a preferred embodiment of this process, the hydrocarbon discharge from a hydrocarbon nozzle into the reactor is made axially at or beyond the midpoint of the combustion section. By this arrangement of the hydrocarbon feed nozzle, the hydrocarbon feed is directly discharged into the area of highest turbulence of the hot combustion gases.

It is presently preferred and constitutes another embodiment of this invention to generate the hot combustion gases from at least two burners discharging fuel and oxidant tangentially into a wide cylindrically shaped precombustion section with the further provision that the equivalent weight ratio of the oxidant gas, being selected from the group consisting of air, oxygen and oxygen-enriched air, to the fuel is not more than 1.2 times the stoichiometric ratio required for the total combustion of the fuel. In the case of air as the oxidant and natural gas as the fuel, the volume ratio for a stoichiometric combustion is 10 volumes of air per 1 volume of fuel gas.

The invention will still be more fully understood and further embodiments thereof will become apparent from the following description of the drawing.

The carbon black reactor shown in FIG. 1 comprises a combustion section 1 and a reaction section 2. The combustion section 1 is essentially cylindrically shaped and two tangential introductory ports 3 for feeding hot combustion gases into the combustion section 1 are provided for, of which only one is shown in FIG. 1. Normally liquid hydrocarbon can be fed into the reactor via an oil discharge nozzle 4, whereas so-called jacket air is introduced into the reactor via a pipe 5 surrounding the oil conduit 6. This jacket air, which is a small portion of the total oxidant introduced, serves to cool the oil nozzle and prevent it from prematurely burning off. The nozzle cooling can, however, also be achieved by a cooling water closed loop circulation. Connected to the downstream end of the reaction section 2 is a carbon black withdrawal pipe 7.

As can be seen from FIGS. 2a, 2b and 2c showing various cross-sections of the reaction section 2, the reaction section has essentially triangular shape. FIG. 2a shows an embodiment in which the reaction section is composed of three identical longitudinal ceramic pieces 8a, 8b, and 8c. By splitting up the reaction portion of the reactor into such identical form pieces, the cost of producing the reactor, as well as the time for assembling the reactor, is considerably reduced.

FIG. 2b shows an embodiment of the reactor which the corners 9 of the triangular cross-section 10 are rounded. In the embodiment shown in FIG. 2c, the cross-section has rounded corners 9 and the sides 11 of the rounded cross-section 10 are curved towards the longitudinal axis of the reactor. The walls of the reaction section 2 of this embodiment shown in FIG. 4 thus are convex.

FIG. 3 shows a carbon black reactor in longitudinal cross-section similar to the reactor shown in FIG. 1. The main difference is that the reaction section 2 of this carbon black reactor is venturi-shaped in addition to having triangular cross-section. This cross-section is further illustrated in the cross-sectional view taken along line 4—4 in FIG. 3, which is shown in FIG. 4.

FIG. 5 shows a still further embodiment of this invention in longitudinal cross-section. The carbon black reactor of this embodiment has two tangential ports 3 and 3' for introduction of hot combustion gases. In the center of the two wide air conduits 12 and 13, two gas discharge nozzles 14 and 15 are arranged. These nozzles are connected via control valves 16 and 17 to a source of fuel, e.g., natural gas, not shown in the drawing. The control valves 16 and 17 are controlled from a flow controller 18 such that the total quantity of fuel introduced via both the valves 14 and 15, with respect to the total quantity of air introduced via conduits 12 and 13, makes a stoichiometric mixture. Furthermore, controller 18 is designed such that a quantity of fuel entering via nozzle 14 is less than stoichiometrically required with respect to the air quantity introduced via conduit 12 and that the fuel quantity introduced via nozzle 15 is more than the quantity stoichiometrically required by the quantity of air entering via conduit 13. Thus a fuel-rich hot combustion gas mixture is entered via port 3', whereas an oxygen-rich hot combustion gas mixture is entered via port 3 into the combustion section 1. The hydrocarbon discharge nozzle 4 in the embodiment of the reactor shown in FIGS. 5 and 6 is extended into the section 20 of the reaction section 2 that has triangular cross-section. Thus, the hydrocarbon is discharged into a highly turbulent mixture of a stoichiometric hot combustion gas mixture.

Downstream of the section 20 having the triangular cross-section, a venturi-shaped cross-section 21 of the reaction section 2 is arranged for further enhancing the pyrolytic decomposition of the hydrocarbon into carbon black. As in FIGS. 1 and 3, the downstream end of the reactor shown in FIGS. 5 and 6 also has quenching means 22. Via these conduits 22, a quenching liquid such as water can be sprayed into the reactor to slow down or stop the pyrolytic decomposition reaction.

FIG. 7 shows another embodiment of the reactor of this invention in which the precombustion section 1 has a triangular shape as shown in FIG. 8. the ports 3a, 3b, and 3c for introducing the hot combustion gases are located in the side confining wall 1a, 1b, and 1c of the combustion section, respectively. Each one of these openings 3a, b, and c is located close to an edge where two of the sides 1a, 1b, and 1c come together. The direction of introduction of hot combustion gases is such that the hot combustion gases flow along the adjacent side.

Still a further reactor for producing carbon black by pyrolytic decomposition of hydrocarbons is shown in a longitudinal cross-section in FIG. 9 and in cross-section along the lines 10—10 in FIG. 10. This carbon black reactor comprises a combustion section 1 confined essentially by an upstream confining wall 1d, and a frustoconically shaped confining wall 1f. The frustoconus converges in downstream direction into a reaction section 2 having triangular cross-section. In this reactor the hydrocarbon is fed not axially, but radially into the reaction section via three feed nozzles 31, 32, and 33, which are surrounded by jacket air pipes 34, 35 and 36, respectively. Oxidant such as air is fed tangentially through two ports 3d (only one is shown in the drawing), whereas fuel such as methane or propane or natural gas is fed through a ring nozzle 4a in essentially radially outward direction via radial openings 41 and 42.

The reaction section 2 at its downstream end is connected via a wall 43 diverging in downstream direction with a wider section 44 in which quench nozzles 22 are arranged.

The invention will still be more fully understood from the following examples:

EXAMPLE I

A carbon black reactor being essentially an O-type reactor having an enlarged circular cross-section combustion section with a triangular cross-section reaction section, was used which had the following dimensions:

| Combustion Section: | | |
|---|---|---|
| Diameter, inches | 4 | — |
| Diameter, cm. | — | 10.2 |
| Length, inches | 4 | — |
| Length, cm. | — | 10.2 |
| Reaction Section (Equilateral Triangle Cross-Section) | | |
| Side length of triangle, inches | 0.75 | — |
| Side length, cm. | — | 1.91 |
| Reaction section length[1], inches | 20 | — |
| Reaction section length, cm. | — | 50.8 |

[1]From inlet at downstream face of combustion section zone to quench locus.

In this reactor carbon black was produced under the following conditions and using the following materials:

| Charged Materials: | | |
|---|---|---|
| Feed benzene, cc/min., (charged axially via ½ inch diameter, or 1.27 cm diameter feed tube into upstream end of precombustion zone). | — | 25 |
| Feed preheat, °F | 752 | — |
| Feed preheat, °C | — | 400 |
| Axial gas (methane): SCF/min | 0.447 | — |
| Axial gas (methane): m³/min (Added axially surrounding feed inlet port via 5 inlet tubes of ¼ inch diameter, or 0.64 cm diameter, evenly spaced in a 1.75 inch diameter, or 4.45 cm diameter, circle surrounding axial feed tube.) | — | 0.0127 |
| Tangential air, SCF/min | 5.70 | — |
| Tangential air, m³/min (Added tangentially into combustion zone via ¼ inch, or 0.64 cm diameter tubes. Four inlets for tangential air were used in two sets of two inlets each located at 180° spacing around the precombustion zone. Of each set of pairs, one inlet was about 1 inch, or 2.54 cm, downstream of inlet wall of precombustion zone and the second inlet was about 3 inches, or 7.62 cm, downstream of the inlet wall of the combustion zone.) | | |

The carbon black produced thereafter was analyzed by standard test methods and the properties of the carbon black are listed in the following:

| Carbon Black Product: | |
|---|---|
| $I_2$NO., m²/gm (ASTM D 1510) | 132 |
| $N_2$SA, m²/gm (ASTM D 3037-"A") | 150 |
| CTAB, m²/gm[a] | 132 |
| 24M4 DBP, cc/100 gm (U.S. Patent 3,548,454)[b] | 105 |
| Production, lbs/hr | (0.6) |
| kg/hr | 1.32 |

[a]Janzen, J. and Kraus, G., Rubber Chem. and Tech., 44, 1278 (1971).
[b]Apparatus for 24M4 DBP. Procedure is ASTM 2414, after crushing, measured by Method B.

From the results of this example, one can readily see that the carbon black produced by the process of this invention and the reactor of this invention has high surface area with relatively low porosity (difference between the nitrogen surface area and the CTAB surface area).

EXAMPLE II

In this example a reactor was used having the following dimensions:

| Combustion Zone: | |
|---|---|
| Diameter, inches | 10.5 |
| Diameter, cm | 26.67 |
| Length, inches | 4 |
| Length, cm | 10.2 |
| Reaction Section Being an Equilateral Triangle Inscribed in a 3″ Diameter Reactor: | |
| Side length, inches | 2.6 |
| Side length, cm | 6.6 |
| Reaction section length, inches | 44 |
| Reaction section length, cm[1] | 111.8 |

[1]From downstream face of combustion section to quench locus.

Carbon black was produced with this reactor in various runs using Ponca oil No. 11, having a BMCI of 122 and a distillation midpoint of 700°F as a feedstock, propane as fuel gas, and air as the oxidant. A small air stream was introduced into the reactor surounding the oil feed pipe, the air introduced as this jacket air was 175 to 220 SCFH, which is contained in the figures for the total air given in the following table.

The properties of the carbon black produced, as well as the parameter values, which are varied, are shown in the following table:

| Run | Length PCC (Precomb.) Inches | Lbs/Hr Oil | Total Air SCFH | % Stoic. Air/Gas | $N_2$SA/CTAB | 24M4 | Tint (Residual) | Yield Wt. % Total Carbon |
|---|---|---|---|---|---|---|---|---|
| 1 | 4 flush | 45.2 | 6175 | 150 | 146/117 | 87.6 | 108(−5.5) | 31.9 |
| 2 | 4 | 61.3 | 7720 | 150 | 124/114 | 89 | 108(−9.5) | 34.2 |
| 3 | 4 | 86.2 | 7720 | 150 | 78/80 | 85 | 90(−11) | 47.9 |

-continued

| Run | Length PCC (Precomb.) Inches | Lbs/Hr Oil | Total Air SCFH | % Stoic. Air/ Gas | N₂SA/ CTAB | 24M4 | Tint (Residual) | Yield Wt. % Total Carbon |
|---|---|---|---|---|---|---|---|---|
| 4 | 2 | 76.7 | 7720 | 150 | 93/97 | 82 | 115(−3.5) | 40.1 |
| 5 | 2 | 62.3 | 7720 | 150 | 151/146 | 85 | 138(+8) | 30.5 |
| 6 | 4 | 65.2 | 7720 | 150 | 117/119 | 92 | 122(+3) | 33.4 Tee Jet Nozzle |
| 7 | 2 | 65.2 | 7720 | 120 | 114/115 | 85 | 127(+8) | 41.6 |
| 8 | 2 | 59.9 | 7720 | 120 | 125/120 | 86 | 122(+2) | 38.4 |
| 9 | 1½ | 59.8 | 7720 | 120 | 139/138 | 90 | 138(+12) | — |
| 10 | 1½ | 66.2 | 7720 | 120 | 118/119 | 85 | 132(+11.5) | 42.3 |
| 11 | 1½ | 60.0 | 7720 | 120 | 135/135 | 87 | 135(+9) | 38.1 |
| 12 | 1½ | 63.2 | 7720 | 110 | 117/119 | 87 | 132(+12.5) | 42.7 |
| 13 | 1½ | 56.6 | 7720 | 110 | 130/131 | 88 | 134(+10) | 39.0 |
| 14 | 1½ | 56.6 | 7720 | 100 | 122/122 | 86 | 133(+11) | 41.7 |
| 15 | 1½ | 50.5 | 7720 | 100 Unbal. | 134/132 | 90 | 133(+9.1) | 38.6 |
| 16 | 1½ | 57.4 | 7720 | 100 Unbal. | 121/112 | 84 | 130(+13.7) | 41.0 |
| 17 | 1½ | 51.1 | 7720 | 100 | 147/143 | 90 | 138(+11) | 37.8 |

The column "length PCC" refers to the location of the end of the water jacket within the precombustion (PCC) section. At 4 inches water jacket was flush with the upstream wall of the precombustion section so that the distance from the downstream wall of the precombustion section was 4 inches. The oil nozzle extended ¼ inch beyond the water jacket. Other runs were carried out with the water jacket positioned 2 inches and 1½ inches away from the downstream wall of the precombustion section. The oil nozzle correspondingly was 1¾ and 1¼ inch from the downstream wall. The column "% Stoic Air/Gas" refers to the composition of the hot combustion gases. The value of 100 in this column refers to a stoichiometric composition of the hot combustion gases, whereas higher figures refer to oxygen-rich mixtures of air and fuel. The N₂ and CTAB surface areas and the 24M4 structure were determined in accordance with the methods mentioned above, whereas the tint was determined in accordance with ASTM D 3265. The tint residue was determined in accordance with the following formula:

Measured Tint (ASTM D 3265) minus [56 + 1.057 (CTAB) -

0.002745 (CTAB)² - 0.2596 (24M4) - 0.201 (N₂SA - CTAB)].

The values for the yield wt. % of total mean weight percent carbon black produced per total carbon charged including carbon in the make oil and in the fuel.

From the results shown in the table, one can see that the carbon black reactor of this invention produced carbon black with high tint. A further improvement, both in the tint residual and in the yield, was achieved by arranging the oil feed nozzle 2 to 2½ inches away from the upstream wall of the combustion section (positions 2 and 1½ in column 1 of the above-shown table). Furthermore, it can be seen that with the extended oil nozzle position, the porosity of the blacks produced was very low.

Reasonable variations and modifications, which will be apparent to those skilled in the art, can be made in this invention without departing from the spirit and scope thereof.

We claim:

1. A tubular carbon black reactor having a longitudinal axis extending from the upstream end to the downstream end thereof comprising
   a. an essentially cylindrical combustion section with the cylindrical axis coextensive with the longitudinal axis, said combustion section being confined by an upstream wall, a cylindrical wall, and a downstream wall,
   b. A reaction section in axial alignment and fluid communication operatively connected with said cylindrical combustion section at the downstream wall thereof, at least a portion of said reaction section being defined by three side walls, said portion having an essentially triangular cross-section,
   c. first means for generating a spirally swirling flow of hot combustion gases in said combustion zone being attached to said combustion zone,
   d. second means for introducing hydrocarbon feed essentially along the longitudinal axis in axial direction into the reactor, said second means being attached to an upstream confining wall of the reactor, and
   e. third means for withdrawing of carbon black-containing gas connected to the downstream end of said reaction section.

2. A carbon black reactor in accordance with claim 1 wherein the angles of said triangular cross-section are all within the range of 30°–100°.

3. A reactor in accordance with claim 2 wherein said cross-section is an equilateral triangle.

4. A carbon black reactor in accordance with claim 1 wherein said second means comprise a nozzle, the hydrocarbon discharge end of which is located within the combustion section axially at or downstream of the center of the combustion section.

5. A carbon black reactor in accordance with claim 1 comprising quench means for introducing quenching fluid to slow down or stop the carbon black formation reaction, which quenching means are located in the downstream section of said reaction section with triangular cross-section, and which quench means are located to discharge the quenching fluid in or near the edges of this section in which two side walls of the reaction section intersect.

6. A carbon black reactor in accordance with claim 1 wherein said essentially triangularly shaped cross-section has rounded-off corners.

7. A carbon black reactor in accordance with claim 1 wherein said reaction section is an essentially cylindrical reaction section having a choke in the upstream portion thereof, which choke has a triangular cross-section.

8. A carbon black reactor in accordance with claim 7 comprising a hydrocarbon feed nozzle extending into said choke with triangular cross-section, comprising a first tangential inlet said combustion section connected to a source of oxygen-rich hot combustion gases, and comprising a second tangential inlet into said combustion section connected to a source of fuel-rich hot combustion gases.

9. A carbon black reactor in accordance with claim 1 wherein said portion of the reaction section which has a triangular cross-section additionally is venturi-shaped and comprises an upstream portion converging in downstream direction and communicating with a downstream portion diverging in downstream direction, and converging and diverging portions having triangular cross-sections.

10. A carbon black reactor having a longitudinal axis extending from the upstream end to the downstream end of the reactor comprising
   a. a combustion section defined by an upstream confining wall and a downstream confining wall, both being essentially parallel to each other and perpendicular to the longitudinal axis of the reactor, and by three confining side walls, all three of these confining side walls being essentially parallel to the longitudinal axis of the reactor so that the cross-section of said combustion section is approximately triangular,
   b. in axial alignment and open communication with said combustion section and attached to the downstream wall thereof, a longitudinal reaction section having a smaller cross-section than said combustion section,
   c. first means attached to said combustion section for generating a closed loop flow of hot combustion gases along said three confining side walls in a direction perpendicular to the longitudinal axis,
   d. second means for introducing hydrocarbon feed along said longitudinal axis in axial direction into the carbon black reactor attached to an upstream confining wall of said reactor, and
   e. third means for withdrawing carbon black-containing gas connected to the downstream end of said reaction section.

11. A carbon black reactor in accordance with claim 10 wherein said first means comprise three openings, one near each intersecting edge of two confining side walls and in one of these two confining side walls facing along the other of these two confining side walls, said three openings being in communication with a source of oxidant gas and of fuel for generating said flow of hot combustion gases along said three confining side walls.

12. A carbon black reactor in accordance with claim 10 wherein the angles of said triangular cross-section are all within the range of 30°–100°.

13. A carbon black reactor in accordance with claim 12 wherein said triangular cross-section is an equilateral triangle.

14. A carbon black reactor in accordance with claim 10 wherein said reaction section has a triangular cross-section.

15. A carbon black reactor in accordance with claim 14 wherein both the reaction section and the combustion section have an equilaterally triangular cross-section, wherein the two equilateral triangles are azimuthally turned relative to each other by 60° around the longitudinal reactor axis.

16. A carbon black reactor in accordance with claim 10 wherein said reaction section has a cylindrical cross-section.

17. A carbon black reactor in accordance with claim 10 wherein said reaction section is venturi-shaped.

18. A carbon black reactor in accordance with claim 10 wherein said reaction section is venturi-shaped and has a triangular cross-section both in the converging and the diverging portions of the venturi-shaped section.

19. A tubular carbon black reactor having a longitudinal axis extending from its upstream to its downstream end comprising
   a. a combustion section having a circular cross-section,
   b. in axial alignment and open communication operatively connected with said combustion section, a reaction section constituting the narrowest of the two sections, being defined by three or four sidewalls and having essentially triangular or, respectively, rectangular cross-section,
   c. first means attached to said combustion section for generating a closed loop spirally swirling flow of hot combustion gases in said combustion section,
   d. second means attached to said reaction section for introducing hydrocarbon feed radially into said reaction section at approximately the center between two side edges, each one of these side edges being the intersection between two of the three or four sidewalls, and
   e. third means attached to the downstream end of the reaction section for withdrawing carbon black-containing smoke.

20. A carbon black reactor in accordance with claim 19 wherein said first means comprise tangential oxidant feed means for introducing oxidant essentially tangentially in contact with the walls confining the combustion section, and radial fuel feed means for introducing fuel from approximately the longitudinal axis in radially outward direction, such as to produce swirling hot combustion gases in said combustion chamber.

21. A carbon black reactor in accordance with claim 19 wherein said combustion section is confined by an essentially plain upstream confining wall perpendicular to the longitudinal axis and by a frustoconically shaped confining wall having the longitudinal axis as its axis, and converging in downstream direction from said upstream confining wall into said reaction section.

22. A carbon black reactor in accordance with claim 19 wherein said combustion section is confined by an essentially plain upstream confining wall and by an essentially plain downstream confining wall, said plain walls being parallel to each other and perpendicular to the longitudinal axis of the reactor, and by a cylindrical wall connecting the two plain walls.

23. A carbon black reactor in accordance with claim 19 wherein every angle of the triangular cross-section of said reaction section is in the range of 30°–100°.

24. A carbon black reactor in accordance with claim 23 wherein all the angles are 60°.

25. A carbon black reactor in accordance with claim 19 wherein the cross-section of said reaction section is a square.

26. A carbon black reactor in accordance with claim 19 wherein said reaction section, having triangularly shaped cross-section, is connected with the downstream end thereof to a widened quench section.

27. A process for the production of carbon black comprising a. generating a spiraling flow of hot combustion gases in a combustion section of a longitudinally disposed reactor having a longitudinal axis extending from the upstream end to the downstream end thereof, b. introducing hydrocarbon feed liquid under normal conditions in axial direction along the longitudinal axis into said combustion section to produce a mixture of said hot combustion gases and said hydrocarbon feed, c. moving said mixture of hot combustion gases and hydrocarbon feed into and through a reaction section being in axial alignment and open communication operatively connected with said combustion section, at least a portion of said reaction section having essentially triangularly shaped cross-section, and d. withdrawing carbon black-containing smoke from the downstream end of the reaction section.

28. A process in accordance with claim 27 wherein said hydrocarbon feed is discharged into the combustion section axially at or beyond the midpoint of the combustion section into admixture with the hot combustion gases.

29. A process in accordance with claim 28 wherein said hot combustion gases are generated by at least two burners discharging fuel and oxidant tangentially into a wide cylindrically shaped precombustion section, the equivalent weight ratio of oxidant to fuel being not more than 1.2 times the equivalent weight ratio for a stoichiometric combustion of the fuel in the oxidant.

* * * * *